United States Patent
Oguma

(10) Patent No.: US 8,879,908 B2
(45) Date of Patent: Nov. 4, 2014

(54) OPTICAL CHANNEL MONITOR

(75) Inventor: Takefumi Oguma, Tokyo (JP)

(73) Assignee: NEC Corporation, Tokyo (JP)

( * ) Notice: Subject to any disclaimer, the term of this patent is extended or adjusted under 35 U.S.C. 154(b) by 227 days.

(21) Appl. No.: 13/495,732

(22) Filed: Jun. 13, 2012

(65) Prior Publication Data

US 2012/0321299 A1    Dec. 20, 2012

(30) Foreign Application Priority Data

Jun. 14, 2011    (JP) .................................. 2011-132627

(51) Int. Cl.
*H04B 10/08*    (2006.01)
*H04B 17/00*    (2006.01)
*H04J 14/02*    (2006.01)
*H04B 10/079*    (2013.01)

(52) U.S. Cl.
CPC ...... *H04B 10/07955* (2013.01); *H04J 14/0227* (2013.01); *H04J 14/026* (2013.01); *H04J 14/0221* (2013.01)
USPC .................................. 398/34; 398/25; 398/38

(58) Field of Classification Search
CPC ................ H04B 10/07–10/0799; H04B 17/00; H04B 17/0002–17/0037; H04J 14/02; H04J 14/0227
USPC .......... 398/25, 34, 37, 38, 82–88, 94, 95, 177
See application file for complete search history.

(56) References Cited

U.S. PATENT DOCUMENTS

| 6,268,943 | B1 * | 7/2001 | Kang ............................... 398/26 |
| 6,980,742 | B1 * | 12/2005 | Liden et al. ..................... 398/85 |
| 7,693,420 | B2 * | 4/2010 | Weaver ........................... 398/33 |
| 2004/0062550 | A1 * | 4/2004 | Terahara et al. ................ 398/91 |
| 2004/0208649 | A1 * | 10/2004 | Matthews et al. ............. 398/195 |
| 2005/0265725 | A1 * | 12/2005 | Okano et al. ................... 398/147 |
| 2010/0166425 | A1 * | 7/2010 | Onaka ............................ 398/79 |
| 2012/0008941 | A1 * | 1/2012 | Oguma .......................... 398/34 |

FOREIGN PATENT DOCUMENTS

| JP | 2000-292644 A | 10/2000 |
| JP | 2001-168841 A | 6/2001 |
| JP | 2002-319899 A | 10/2002 |
| WO | WO 2010110078 | * 9/2010 ................ G01J 3/02 |

* cited by examiner

*Primary Examiner* — Li Liu

(74) *Attorney, Agent, or Firm* — Sughrue Mion, PLLC

(57) ABSTRACT

An optical channel monitor includes a demultiplexer, a plurality of paths and a processing section. The demultiplexer demultiplexes an input optical signal, which is wavelength-multiplexed, for respective multiplexed wavelengths to generate a plurality of optical signals. The plurality of paths respectively generate a plurality of digital signals indicating optical powers of the plurality of optical signals. The processing section inputs the plurality of digital signals to calculate correction values of the optical powers, which correspond to characteristics of the demultiplexer. The demultiplexer includes a filter having FMHM (Full With at Half Maximum) within a predetermined range. The predetermined range is set based on a pass center wavelength accuracy of the filter and an oscillation wavelength accuracy of a transponder which generates the input optical signal.

7 Claims, 4 Drawing Sheets

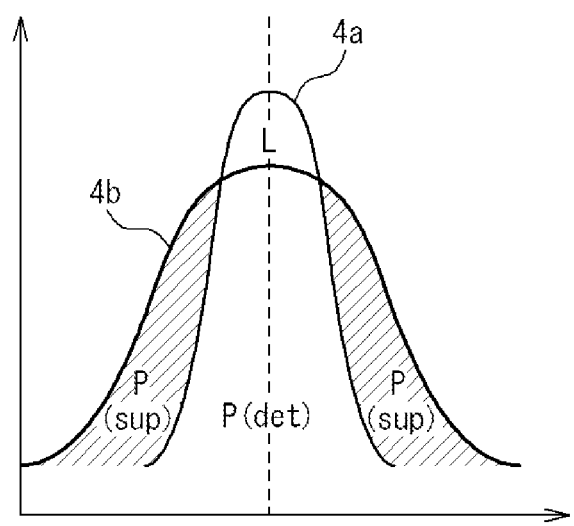

US 8,879,908 B2

OPTICAL CHANNEL MONITOR

INCORPORATION BY REFERENCE

This application is based upon and claims the benefit of priority from Japanese patent application No. 2011-132627, filed on Jun. 14, 2011, the disclosure of which is incorporated herein in its entirety by reference.

TECHNICAL FIELD

The present invention relates to an optical channel monitor, and more particularly, to an optical channel monitor of polychromator system.

BACKGROUND ART

In optical communication systems, in order to transmit more information on a line of optical fiber, there is used a wavelength division multiplexing. Namely, a frequency domain is divided into a plurality of channels, and a plurality of optical signals respectively corresponding to the plurality of channels are multiplexed to be transmitted on the same optical fiber at the same time.

Here, it is required to monitor that optical powers of optical signals of the respective optical channels are within normal range. An optical channel monitor (hereinafter, referred to as "OCM") is a device to monitor optical powers of respective channels of an optical circuit. OCMs are largely categorized into two types: a monochromator system and a polychromator system.

An OCM of monochromator system carries out wavelength scan of an optical filter provided internally at first, receives outputs of the optical filter by a photo detector, and monitors optical levels of the received incident light at respective wavelengths. Because of its structure, the OCM of monochromator system requires a light source provided externally in order to secure wavelength accuracy by compensating variation with time of the optical filter. Moreover, since the time to carry out the wavelength scan is required, it takes a comparatively longer time to collect data.

An OCM of polychromator system monitors optical levels of incident light at respective wavelength by arranging a plurality of photo detectors on a demultiplexing side of a wavelength demultiplexer such as a diffraction grating and scanning light reception levels of the respective photo detectors. Since the plurality of photo detectors collect data at the same time, the OCM of polychromator system operates at higher speed than the OCM of monochromator system. However, as for a conventional OCM of polychrometor system, a resolving power is required to be improved in order to distinguish amplified spontaneous emission (hereinafter, referred to as "ASE") from optical signal components. With reference to the necessity, there is known a problem that a lot of numbers of photo detectors are required to be included in an OCM of polychromator system and then result in increase in its manufacturing cost.

With reference to the above descriptions, Japanese Patent Publication (JP-P2000-292644A) discloses an optical module. The optical module includes a collimator, demultiplexing means and light receiving means. Here, the collimator converts multiple wavelength signal light from an optical transmission line into parallel rays. The demultiplexing means include a plurality of optical filters of different passing wavelength bands and demultiplex the parallel rays into a plurality of signal lights by making the parallel rays to pass the plurality of optical filters. The light receiving means receive the signal lights of respective wavelengths, which are demultiplexed by the demultiplexing means.

Japanese Patent Publication (JP-P2001-168841A) discloses a wavelength multiplex optical amplifier. The wavelength multiplex optical amplifier amplifies at least two or more signal light wavelengths as a bundle. The wavelength multiplex optical amplifier includes an optical monitoring section and an optical variable attenuator section. Here, as for the optical monitoring section, the wavelength multiplex optical amplifier is a fiber type optical amplifier, as for the optical amplifier, impurity material, impurity concentration and fiber length of impurity-doped fiber and excitation intensity are set such that a desired gain and a flat gain profile are obtained when the number of input wavelength is maximum number, and, it is possible to monitor optical levels of wavelength multiplexed light for respective wavelengths and monitor wavelength number of the wavelength multiplexed light. The optical variable attenuator section attenuates optical levels of lights of respective wavelengths without changing gain profile of the wavelength multiplexed light or with planarizing the gain profile. The wavelength multiplex optical amplifier is characterized in that the attenuation of the optical variable attenuator section is determined by detection signals of the optical monitoring section.

Japanese Patent Publication (JP-P2002-319899A) discloses a wavelength monitoring device. The wavelength monitoring device monitors, for respective wavelengths, an optical signal which is wavelength-multiplexed to be transmitted. The wavelength monitoring device includes an interleaver and a plurality of wavelength monitoring circuits. Here, the interleaver divides the wavelength multiplexed optical signal into a plurality of families in accordance with the arrangement of wavelengths. The plurality of wavelength monitoring circuits respectively demultiplex optical signals of the respective families divided by the interleaver and detect optical signals of respective wavelengths.

SUMMARY

An exemplary object of the present invention is to provide an OCM of polychromator system, of which resolving power is improved without increasing manufacturing cost.

An optical channel monitor according to an exemplary aspect of the present invention includes a demultiplexer, a plurality of path, and a processing section. The demultiplexer demultiplexes an input optical signal, which is wavelength-multiplexed, for respective multiplexed wavelengths to generate a plurality of optical signals. The plurality of paths respectively generate a plurality of digital signals respectively indicating optical powers of the plurality of optical signals. The processing section inputs the plurality of digital signals to calculate correction values of the optical powers, which correspond to characteristics of the demultiplexer. The demultiplexer includes a filter having FWHM (Full With at Half Maximum) within a predetermined range. The predetermined range is set based on a pass center wavelength accuracy of the filter and an oscillation wavelength accuracy of a transponder which generates the input optical signal.

The OCM according to the exemplary aspect of the present invention optimizes a signal band detected by each photo detector and carries out a power correction calculation. In this way, even in an environment in which a signal to noise ratio is bad, a power of signal light can be accurately detected and an incident noise component to the photo detector at the signal quiescent time can be reduced. Consequently, according to the exemplary aspect of the present invention, it is possible to improve a dynamic range in an OCM of polychromator system.

BRIEF DESCRIPTION OF THE DRAWINGS

The above and other objects, advantages and features of the present invention will be more apparent from the following description of certain exemplary embodiments taken in conjunction with the accompanying drawings, in which:

FIG. 4 is a graph group which compares spectra of the transponder and the demultiplexer shown in FIG. 3A and FIG. 3B.

EXEMPLARY EMBODIMENTS

Hereinafter, an OCM according to exemplary embodiments of the present invention will be described with reference to the attached drawings.

Exemplary Embodiments

Figure 1:
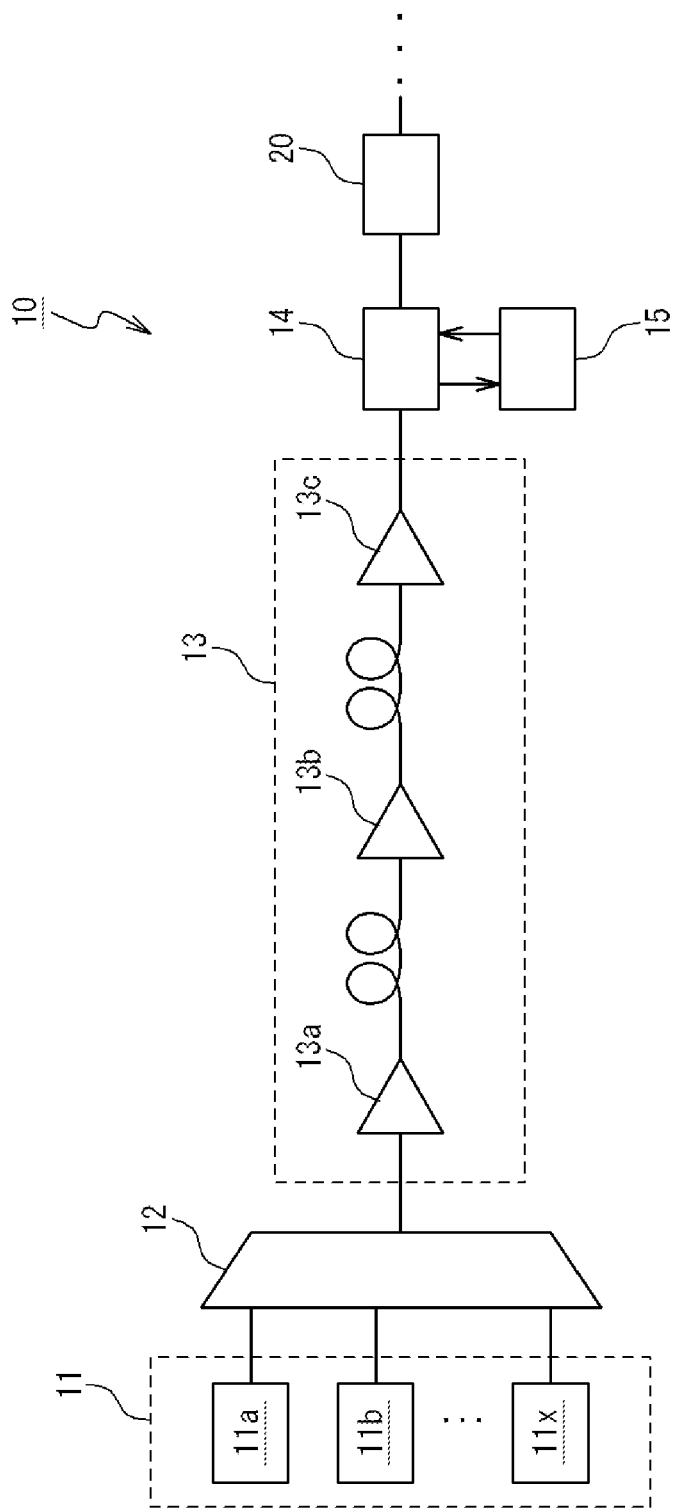
FIG. 1 is a block circuit diagram schematically showing an overall configuration of an example of a wavelength multiplex transmission system which uses an OCM according to an exemplary embodiment of the present invention.

FIG. 1 is a block circuit diagram schematically showing an overall configuration of an example of a wavelength multiplex transmission system 10 which uses an OCM according to an exemplary embodiment of the present invention. Components of the wavelength multiplex transmission system 10 of FIG. 1 are described. The wavelength multiplex transmission system 10 of FIG. 1 includes a transponder section 11, an optical multiplexer 12, an optical amplifying section 13, an optical add/drop device 14, a transponder 15 and an optical channel monitoring section 20. The transponder section 11 includes a plurality of transponders 11a to 11x. It is preferred that the total number of the transponders 11a to 11x is equal to or more than the total number of multiplexed wavelengths. It should be noted that there is no limitation to the total number of the transponders 11a to 11x and the present invention is not limited with respect to the total number. The optical amplifying section 13 includes three optical amplifiers 13a to 13c in total. It should be noted that this number is merely an example, there is no limitation to the total number of the optical amplifiers 13a to 13c and the present invention is not limited with respect to the total number. Details of the optical channel monitoring section 20 will be described later.

Connection relations among the components of the wavelength multiplex transmission system 10 of FIG. 1 will be described. Respective output sections of the plurality of transponders 11a to 11x are respectively connected to a plurality of input sections of the optical multiplexer 12. The plurality of optical amplifiers 13a to 13c are serially connected in this order. An output section of the optical multiplexer 12 is connected to an input section of the optical amplifying section 13, i.e., an input section of the optical amplifier 13a at a first stage. An output section of the optical amplifying section 13, i.e., to an output section of the optical amplifier 13c at a final stage is connected to a first input section of the optical add/drop device 14. A first output section of the optical add/drop device 14 is connected to an input section of the transponder 15. An output section of the transponder 15 is connected to a second input section of the optical add/drop device 14. A second output section of the optical add/drop device 14 is connected to an input section of the optical channel monitoring section 20. It should be noted that the optical elements are connected to each other via optical transmission lines in general.

Operations of the components of the wavelength multiplex transmission system 10 of FIG. 1 will be schematically described. The plurality of transponders 11a to 11x of the transponder section 11 respectively convert electric signals into optical signals and output the optical signals. The optical multiplexer 12 wavelength-multiplexes a plurality of input optical signals to generate one optical signal and outputs the optical signal. Each of the plurality of optical amplifiers 13a to 13c amplifies input wavelength multiplexed optical signal and outputs the amplified signal.

The optical add/drop device 14 cooperates with the transponder 15 to insert another optical signal into input wavelength multiplexed optical signal and outputs the resultant signal. It should be noted that the optical add/drop device 14 includes an optical filter provided internally. The optical filter has an effect on the spectrum of output wavelength multiplexed optical signal. The effect will be described later. Also, operations of the optical channel monitoring section 20 will be described later.

Figure 2:
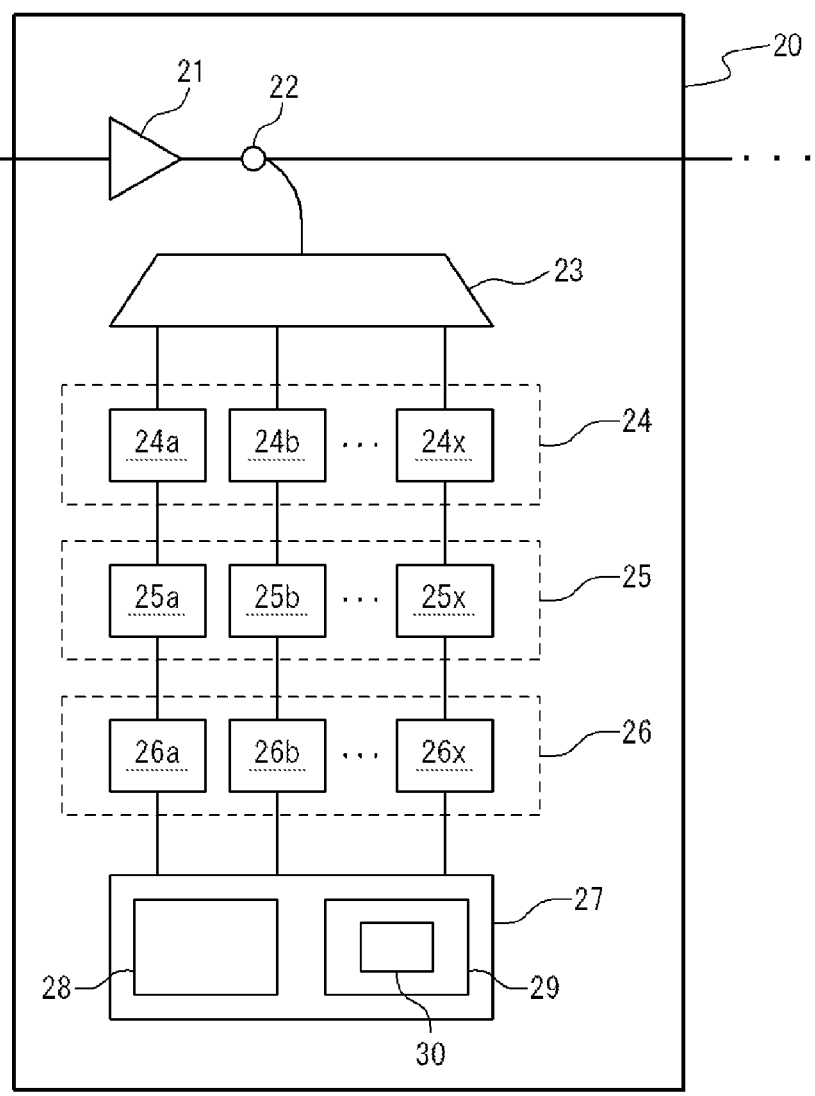
FIG. 2 is a block circuit diagram schematically showing a configuration of an optical channel monitoring section according to the exemplary embodiment of the present invention.

FIG. 2 is a block circuit diagram schematically showing a configuration of the optical channel monitoring section 20 according to the exemplary embodiment of the present invention. Components of the optical channel monitoring section 20 of FIG. 2 will be described. The optical channel monitoring section 20 includes an optical amplifier 21, an optical tap 22, an optical demultiplexer 23, a photo detector section 24, a current-voltage converting section 25, an analog-digital converting section 26 and a processing section 27. The photo detector section 24 includes a plurality of photo detectors 24a to 24x. The current-voltage converting section 25 includes a plurality of current-voltage converters 25a to 25x. The analog-digital converting section 26 includes a plurality of analog-digital converters 26a to 26x. The processing section 27 includes a computing section 28 and a storage section 29. The storage section 29 stores a look-up table 30.

As described below, a photo detector 24i, a current-voltage converter 25i and an analog-digital converter 26i, which have the same suffix "i", are serially connected in this order to form a path. Accordingly, the total numbers of the photo detectors 24a to 24x, the current-voltage converters 25a to 25x and the analog-digital converters 26a to 26x are the same, and are equal to the total number of the paths. Although it is preferred that the total number of the paths is equal to or more than the total number of multiplexed wavelengths, the total number of the paths is not necessarily required to be equal to the total number of the transponders 11a to 11x.

Connection relations among the components of the optical channel monitoring section 20 of FIG. 2 will be described. An input section of the optical amplifier 21 is connected to the input section of the optical channel monitoring section 20, i.e., to the second output section of the optical add/drop device 14. An output section of the optical amplifier 21 is connected to an input section of the optical tap 22. An output section of the optical tap 22 is connected to an input section of the optical demultiplexer 23. A plurality of output sections of the optical demultiplexer 23 are connected in parallel to respective input sections of the plurality of photo detectors 24a to 24x. Respective output sections of the photo detectors 24a to 24x are connected in parallel to respective input sections of the plurality of current-voltage converters 25a to 25x. Respective output sections of the plurality of current-voltage converters 25a to 25x are connected in parallel to respective input sections of the plurality of analog-digital converters 26a to 26x. Respective output sections of the plurality of analog-digital converters 26a to 26x are connected in parallel to a plurality of input sections of the processing section 27.

It should be noted that although another output section of the optical tap 22 is preferred to be connected to another optical element via an optical transmission line, further explanations are omitted since it does not relate to the exemplary embodiment of the present invention. Alternatively, as for the optical channel monitoring section 20 according to the exemplary embodiment, it is possible that the optical tap 22 is omitted and the output section of the optical amplifier 21 is directly connected to the input section of the optical demultiplexer 23.

Operations of the components of the optical channel monitoring section 20 of FIG. 2 will be described. The optical amplifier 21 amplifies an input wavelength multiplexed optical signal and outputs the amplified signal. The optical tap 22 divides an input wavelength multiplexed optical signal into two or more wavelength multiplexed optical signals having the same components and outputs the signals respectively from two or more output sections.

The optical demultiplexer 23 demultiplexes an input wavelength multiplexed optical signal for respective channels to generate and output a plurality of optical signals. Characteristics of the generated plurality of optical signals depend on characteristics of filters provided internally in the optical demultiplexer 23. Details of the filter will be described later.

Each of the plurality of photo detectors 24a to 24x photoelectric-converts input optical signal into electric signal and outputs the electric signal. As each of the plurality of photo detectors 24a to 24x, for example, a general PIN-PD (P-intrinsic-N Photo Diode) for infrared or the like can be used.

Each of the plurality of current-voltage converters 25a to 25x converts input current into voltage and outputs the voltage. As each of the plurality of current-voltage converters 25a to 25x, for example, a trans-impedance amplifier, a logarithmic amplifier, a CCD (Charge Coupled Device) or the like can be used.

Each of the plurality of analog-digital converters 26a to 26x converts input analog electric signal into digital electric signal and outputs the digital electric signal.

The processing section 27 refers to the look-up table 30 stored in the storage section 29 to generate, by using computing section 28, optical power correction values corresponding to digital electric signals inputted for respective channels and outputs the optical power correction values from a not-shown output section. As for the configuration of the processing section 27, for example, a digital computing unit such as a general DSP (Digital Signal Processor) or CPU (Central Processing Unit) can be used. For example, the look-up table 30 defines corresponding relations including digital electric signals and optical power correction values. The optical power correction values correspond to characteristics of the filters.

It should be noted that the components having the same suffix "a" to "x" among the plurality of photo detectors 24a to 24x, the plurality of current-voltage converters 25a to 25x and the plurality of analog-digital converters 26a to 26x are serially connected. Therefore, the photo detector 24i, the current-voltage converter 25i and the analog-digital converter 26i having the same suffix "i" can be considered as a path which converts an optical signal of a channel outputted from the optical demultiplexer 23 into a digital voltage signal.

Demultiplexing in the optical demultiplexer 23 will be described in detail. The optical demultiplexer 23 demultiplexes input wavelength multiplexed optical signal for channels of wavelength division multiplex communication. Wavelengths corresponding to the respective channels are denoted by λ1 to λm from shorter to longer. Here, the maximum value m of the suffix is preferred to be equal to or smaller than the total number of the paths. Here, λm is the maximum wavelength in the wavelength multiplex transmission system 10 according to the exemplary embodiment.

In the exemplary embodiment, the respective channels are in conformity with, for example, signal light wavelengths of DWDM (Dense Wavelength Division Multiplexing) prescribed by ITU-T (International Telecommunication Union Telecommunication Standardization Sector). According to the provision, for example, as for L-band, wavelength λ1 corresponds to 191.9 THz, wavelength λ41 corresponds to 196.9 THz, and a wavelength interval is set to 100 GHz. However, it is an example and does not limit the present invention.

Figure 3A:
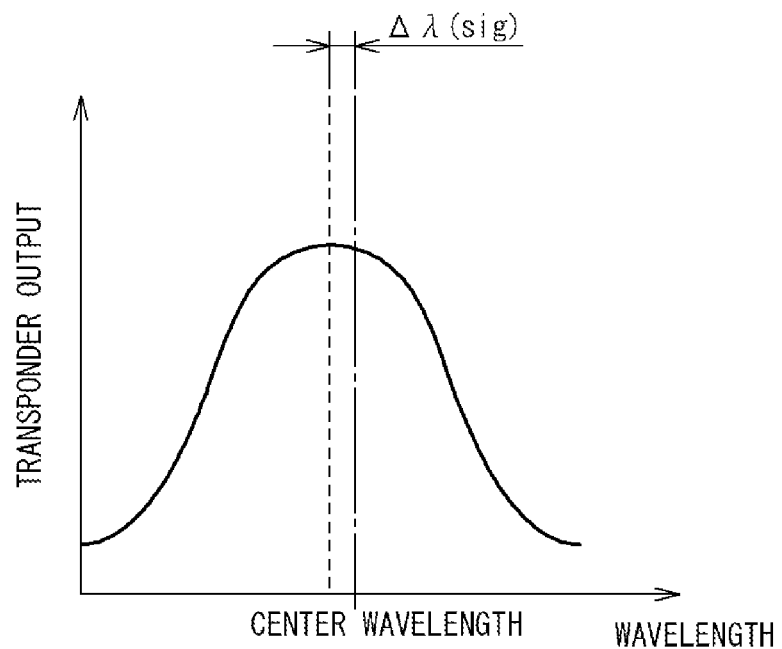
FIG. 3A is a graph showing an example of output spectrum of a transponder.

FIG. 3A is a graph showing an example of output spectrum of the transponders 11a to 11x. In the graph of FIG. 3A, the vertical axis indicates wavelength, while the horizontal axis indicates output of the transponders 11a to 11x. There is a case that the output spectrum of the transponders 11a to 11x is shifted from the original center wavelength due to environmental change or change with time. This wavelength shift amount is denoted as Δλ (sig).

Figure 3B:
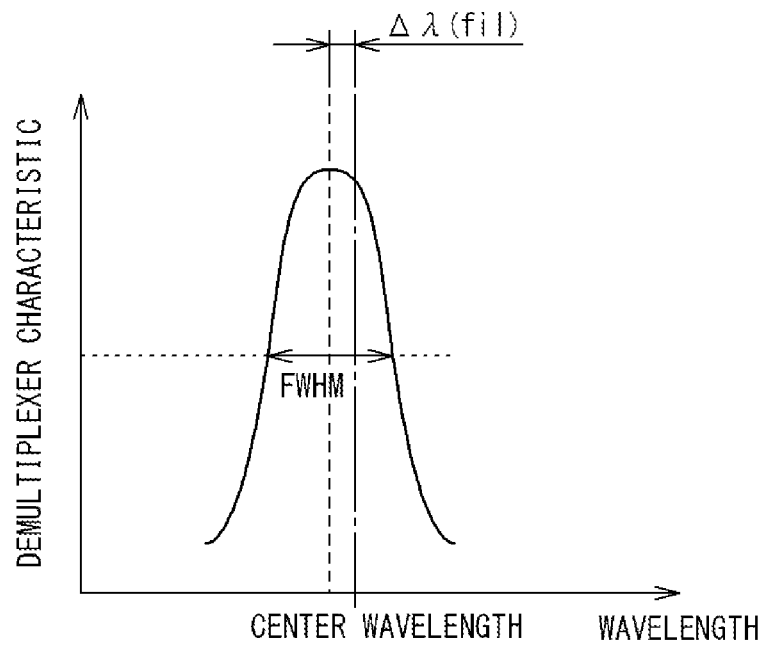
FIG. 3B is a graph showing output spectrum of an optical demultiplexer used in the optical channel monitoring section according to the exemplary embodiment.

FIG. 3B is a graph showing output spectrum of the optical demultiplexer 23 used in the optical channel monitoring section 20 according to the exemplary embodiment. In the graph of FIG. 3B, the horizontal axis indicates wavelength, while the vertical axis indicates demultiplexer characteristic. The output spectrum of the demultiplexer 23 depends on the design of the filter provided internally in the optical demultiplexer 23. For example, when AWD (Array Waveguide Gratings) as a general optical demultiplexer are used, its spectrum shape will be a shape of Gaussian function which is represented by Gaussian distribution, a flat-top shape which is approximated by third order Butterworth shape or the like.

A full width at half maximum (hereinafter, referred to as "FWHM") of the filter is denoted as FWHM (fil). A wavelength shift amount of the optical demultiplexer 23 from a pass center wavelength of the filter due to environmental change and change with time is denoted as Δλ (fil).

FIG. 4 is a graph group which compares the output spectra of the demultiplexer and the transponders 11a to 11x shown in FIG. 3A and FIG. 3B. In FIG. 4, a graph showing the spectrum of the demultiplexer is referred to as a first graph 4a. In the same way, a graph showing the spectrum of the transponders is referred to as a second graph 4b. For each graph of FIG. 4, the horizontal axis indicates wavelength λ, while the vertical axis indicates optical intensity. In FIG. 4, there are four areas divided by the first graph 4a and the second graph 4b. A first area P (det) is an area below both of the first graph 4a and the second graph 4b, and indicates signal components detected by the photo detector. A second area L is an area below the first graph 4a and above the second graph 4b, and indicates components which can pass the demultiplexer and cannot be detected by the photo detector, i.e., loss. Third and fourth areas P (sup) are areas above the first graph 4a and below the second graph 4b, and indicate signal components which are suppressed by the demultiplexer. Such suppression occurs when FWHM of the demultiplexer as filter is narrower than FWHM of input signal, and the suppressed signal components are represented by two areas separated in left and right in the example of FIG. 4.

Consequently, optical intensity actually detected by the photo detector can be represented as below in an ideal condition that there is no noise component.

$$P0+L=P(det)+P(sup)$$

$$P0=P(det)-L+P(sup)$$

$$P0=(1+k)P(det)-L$$

Here, P0 is optical intensity detected by the photo detector when only one wave incidents. L indicates a dead loss of the demultiplexer, i.e., the loss L in FIG. 4. The coefficient k is a ratio of P (det) and P (sup).

$$k=P(sup)/P(det)$$

It is uniquely determined based on the spectra shapes of signal and filter, and varies due to the wavelength shift Δλ (fil) of the filter and the wavelength shift Δλ (sig) of the transponder.

The variation occurs in the coefficient k due to the wavelength shift Δλ (fil) of the filter and the wavelength shift Δλ (sig) of the transponder is referred to as Δk. The variation Δk directly affects power detection accuracy of OCM. Accordingly, in general, the permissible level of the variation Δk is considered to be 0.5 dB or so.

In order to suppress the variation Δk, it is preferred to increase the FWHM of the filter. Hereinafter, a full width at half maximum of the pass center wavelength accuracy of the filter is denoted as FWHM (fil). Meanwhile, a large FMHW means a large RBW (Resolution Band Width: Power Integration Interval) along wavelength. Therefore, as for wavelength multiplex signal to which ASE is added, there is a demerit of reduction in dynamic range of photo detector, i.e., reduction in difference between optical intensities detected by photo detector when signal is on and off. Accordingly, it is preferred that the FWHM (fil) as the full width at half maximum of the pass center wavelength accuracy of the filter is set as small as possible within a range which ensures the permissible level of the variation Δk.

With regard to the FWHM (fil) as the full width at half maximum of the pass center wavelength accuracy of the filter which satisfies the condition of the variation Δk smaller than 0.5 dB, a numerical simulation is carried out based on an algorithm according to the exemplary embodiment of the present invention. The results of the simulation are described below. When the full width at half maximum of the pass center wavelength accuracy of the filter, FWHM (fil) is set as small as possible within a range which satisfies the following inequality, there is obtained a result which is desirable to satisfy both of the dynamic range of the photo detector and the variation Δk. It should be noted that there is a range for the permissible value of the FWHM (fil) as the full width at half maximum of the pass center wavelength accuracy of the filter, since the optimum value changes in accordance with the spectrum of the transponder.

In a case that the filter spectrum has flat-top shape:

$$1.5(\Delta\lambda(fil)+\Delta\lambda(sig))\leq FWHM(fil)\leq 10(\Delta\lambda(fil)+\Delta\lambda(sig)).$$

In a case that the filter spectrum has Gaussian shape:

$$2(\Delta\lambda(fil)+\Delta\lambda(sig))\leq FWHM(fil)\leq 10(\Delta\lambda(fil)+\Delta\lambda(sig)).$$

Explanations are given below with regard to the algorithm according to the exemplary embodiment of the present invention and the numerical simulation based on it, which are described above. In a case of a Gaussian filter, a simulation is carried out by using a transfer function of a shape represented by a Gaussian distribution to obtain an optimum value of FWHM. In a case of a flat-top filter, a transfer function of the filter is approximated by third order Butterworth shape, for example. In this case, when the transfer function is denoted as H (jω) and its gain is denoted as G (ω), those are defined by the following equation:

$$G^2(\omega)=|H(j\omega)|^2=G_0^2/(1+(\omega/\omega_c)^{(2\times 3)}).$$

Here, ωc is a cut-off frequency and G0 is a gain at zero frequency. In the exemplary embodiment, a simulation is carried out with the cut-off frequency ωc being varied to obtain an optimum value of FWHM.

It should be noted that according to the above simulation results, FWHM is equal to or smaller than 0.5 dB in the all of the following three signal formats which are generally used at present. These three signal formats are 10G-OOK (10 Gbps on-off keying), 40G-DQPSK (40 Gbps differential quadratic phase shift keying) and 40G-DPSK (40 Gbps differential phase shift keying). Furthermore, the following values are used in the above simulation.

$$\Delta\lambda(fil)=\pm 0.04\ nm$$

$$\Delta\lambda(sig)=\pm 0.02\ nm$$

For example, FWHM of the filter of the optical demultiplexer can be set such that a condition is satisfied in which a ratio of P (0) and P (det) is equal to or smaller than 0.5 dB for all signal formats of 10G-OOK (10 Gbps on-off keying), 40G-DQPSK (40 Gbps differential quadratic phase shift keying) and 40G-DPSK (40 Gbps differential phase shift keying). Here, the P (0) is a value obtained by integrating a signal spectrum before passing the filter during integration interval from a signal light wavelength according to the ITU definition−50 GHz to the signal light wavelength+50 GHz. The P (det) is a value obtained by integrating a waveform of the signal spectrum after passing the filter (a product of the signal spectrum before passing the filter and the filter waveform) during the same integration interval.

As described above, according to the exemplary embodiment of the present invention, an OCM of high accuracy and wide dynamic range can be implemented. The reason is that power detection accuracy and filter bandwidth of the OCM are optimized.

While the invention has been particularly shown and described with reference exemplary embodiments thereof, the invention is not limited to these embodiments. It will be understood by those skilled in the art that various changes in form and details may be made therein without departing from the spirit and scope of the present invention as defined by the claims.

What is claimed is:

1. An optical channel monitor comprising:
a demultiplexer configured to demultiplex an input optical signal, which is wavelength-multiplexed, for respective multiplexed wavelengths to generate a plurality of optical signals;
a plurality of paths which respectively generate a plurality of digital signals indicating optical powers of said plurality of optical signals; and
a processing section which inputs said plurality of digital signals to calculate correction values of said optical powers, which correspond to characteristics of said demultiplexer,
wherein said demultiplexer includes a filter having FWHM (Full Width at Half Maximum) within a predetermined range,
wherein said predetermined range is set based on a pass center wavelength accuracy of said filter and an oscillation wavelength accuracy of a transponder which generates said input optical signal,
wherein said filter includes a Gaussian filter represented by a Gaussian distribution,
wherein said pass center wavelength accuracy is denoted as Δλ (fil),
wherein said oscillation wavelength accuracy is denoted as Δλ (sig), and
wherein said FWHM satisfies a following inequality:

$$2(\Delta\lambda(fil)+\Delta\lambda(sig)) \leq FWHM \leq 10(\Delta\lambda(fil)+\Delta\lambda(sig)).$$

2. The optical channel monitor according to claim 1, wherein said FWHM is set such that a condition is satisfied in which a ratio of P (0) and P (det) is equal to or smaller than 0.5 dB for all signal formats of 10G-OOK (10 Gbps on-off keying), 40G-DQPSK (40 Gbps differential quadratic phase shift keying) and 40G-DPSK (40 Gbps differential phase shift keying),
wherein said P (0) denotes a value obtained by integration during an integration interval from −50 GHz to +50 GHz, and
wherein said P (det) denotes a value obtained by integration during said integration interval.

3. The optical channel monitor according to claim 1, wherein said processing section includes:
a storage section storing a look-up table defining corresponding relations including said digital signals and correction values of said optical powers, which correspond to characteristics of said filter; and
a power correction computing section which calculates said correction values of said optical powers by referring to said digital signals and said look-up table.

4. The optical channel monitor according to claim 1, wherein said plurality of paths respectively include:
photoelectric converting sections which respectively convert optical powers into currents with respect to said plurality of optical signals;
current-voltage converting sections which convert said currents into voltages; and
analog-digital converting sections which convert said voltages into said plurality of digital signals.

5. An optical channel monitor comprising:
a demultiplexer configured to demultiplex an input optical signal, which is wavelength-multiplexed, for respective multiplexed wavelengths to generate a plurality of optical signals;
a plurality of paths which respectively generate a plurality of digital signals indicating optical powers of said plurality of optical signals; and
a processing section which inputs said plurality of digital signals to calculate correction values of said optical powers, which correspond to characteristics of said demultiplexer,
wherein said demultiplexer includes a filter having FWHM (Full Width at Half Maximum) within a predetermined range,
wherein said predetermined range is set based on a pass center wavelength accuracy of said filter and an oscillation wavelength accuracy of a transponder which generates said input optical signal,
wherein said filter includes a flat-top filter approximated by third order Butterworth shape,
wherein said pass center wavelength accuracy is denoted as Δλ (fil),
wherein said oscillation wavelength accuracy is denoted as Δλ (sig), and
wherein said FWHM satisfies a following inequality:

$$1.5(\Delta\lambda(fil)+\Delta\lambda(sig)) \leq FWHM \leq 10(\Delta\lambda(fil)+\Delta\lambda(sig)).$$

6. A wavelength multiplex transmission system comprising:
a transponder section which outputs a first plurality of optical signals;
a multiplexer configured to multiplex said first plurality of optical signals to generate an input optical signal which is wavelength-multiplexed;
a demultiplexer which demultiplexes said input optical signal for respective multiplexed wavelengths to generate a second plurality of optical signals;
a plurality of paths which respectively generate a plurality of digital signals indicating optical powers of said second plurality of optical signals; and
a processing section which inputs said plurality of digital signals to calculate correction values of said optical powers, which correspond to characteristics of said demultiplexer,
wherein said demultiplexer includes a filter having FWHM (Full Width at Half Maximum) within a predetermined range,
wherein said predetermined range is set based on a pass center wavelength accuracy of said filter and an oscillation wavelength accuracy of said transponder section,
wherein said filter includes a Gaussian filter represented by a Gaussian distribution,
wherein said pass center wavelength accuracy is denoted as Δλ (fil),
wherein said oscillation wavelength accuracy is denoted as Δλ (sig), and
wherein said FWHM satisfies a following inequality:

$$2(\Delta\lambda(fil)+\Delta\lambda(sig)) \leq FWHM \leq 10(\Delta\lambda(fil)+\Delta\lambda(sig)).$$

7. A wavelength multiplex transmission system comprising:
a transponder section which outputs a first plurality of optical signals;
a multiplexer configured to multiplexe said first plurality of optical signals to generate an input optical signal which is wavelength-multiplexed;
a demultiplexer which demultiplexes said input optical signal for respective multiplexed wavelengths to generate a second plurality of optical signals;
a plurality of paths which respectively generate a plurality of digital signals indicating optical powers of said second plurality of optical signals; and
a processing section which inputs said plurality of digital signals to calculate correction values of said optical powers, which correspond to characteristics of said demultiplexer,
wherein said demultiplexer includes a filter having FWHM (Full Width at Half Maximum) within a predetermined range,
wherein said predetermined range is set based on a pass center wavelength accuracy of said filter and an oscillation wavelength accuracy of said transponder section,
wherein said filter includes a flat-top filter approximated by third order Butterworth shape,
wherein said pass center wavelength accuracy is denoted as Δλ (fil),
wherein said oscillation wavelength accuracy is denoted as Δλ (sig), and
wherein said FWHM satisfies a following inequality:

$$1.5(\Delta\lambda(fil)+\Delta\lambda(sig)) \leq FWHM \leq 10(\Delta\lambda(fil)+\Delta\lambda(sig)).$$

* * * * *

UNITED STATES PATENT AND TRADEMARK OFFICE
CERTIFICATE OF CORRECTION

PATENT NO. : 8,879,908 B2  
APPLICATION NO. : 13/495732  
DATED : November 4, 2014  
INVENTOR(S) : Takefumi Oguma Page 1 of 1

It is certified that error appears in the above-identified patent and that said Letters Patent is hereby corrected as shown below:

Title Page item (57) Abstract: Delete "FMHM (Full With" and insert -- FWHM (Full Width --

In the Specification

Column 2, Line 56: Delete "With" and insert -- Width --

Column 6, Line 38: Delete "AWD" and insert -- AWG --

Column 7, Line 29: Delete "FMHW" and insert -- FWHM --

In the Claims

Column 10, Line 39: In Claim 7, delete "multiplexe" and insert -- multiplex --

Signed and Sealed this
Eighteenth Day of August, 2015

Michelle K. Lee
*Director of the United States Patent and Trademark Office*